(12) United States Patent
Pearson et al.

(10) Patent No.: US 9,560,611 B1
(45) Date of Patent: Jan. 31, 2017

(54) CHARACTERIZING SLAVE CLOCK SYNCHRONIZATION BEHAVIOR BY MEANS OF DROPPED SYNC PACKETS

(71) Applicant: Sprint Communications Company, L.P., Overland Park, KS (US)

(72) Inventors: Timothy Hugh Pearson, Overland Park, KS (US); Steven Kenneth Guthrie, Kansas City, MO (US); Seng Gan, Ashburn, VA (US); Adeel Ahmed Siddiqui, Leesburg, VA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/989,108

(22) Filed: Jan. 6, 2016

Related U.S. Application Data (63) Continuation of application No. 14/043,643, filed on Oct. 1, 2013, now Pat. No. 9,271,247.

(51) Int. Cl.
*H04L 7/00* (2006.01)
*G06F 1/12* (2006.01)
*H04W 56/00* (2009.01)

(52) U.S. Cl.
CPC .......... *H04W 56/00* (2013.01); *G06F 1/12* (2013.01); *H04L 7/0054* (2013.01)

(58) Field of Classification Search
CPC ......... H04W 56/00; H04L 7/00; H04L 7/0054; G06F 1/12
See application file for complete search history.

(56) References Cited

U.S. PATENT DOCUMENTS

| 2010/0034534 | A1  |  2/2010 | Niibe et al. |
| 2013/0077509 | A1* |  3/2013 | Hirota ............... H04L 47/56 370/252 |
| 2013/0315104 | A1* | 11/2013 | Miyabe ............... H04L 45/02 370/255 |

OTHER PUBLICATIONS

GPRS—3rd Generation Partnership Project; Technical Specification Group Core Network and Terminals; General Packet Radio System (GPRS) Tunnelling Protocol User Plane (GTPv1-U) (Release 10), Sep. 2011, 25 pages.
GSM—RFC 2297, Newman, et al., Ipsilon's General Switch Management Protocol Specification Version 2.0, Mar. 1998, 102 pages.
IPv4—RFC 2734, Johansson, P., IPv4 over IEEE 1394, Dec. 1999, 28 pages.

(Continued)

*Primary Examiner* — Omar Ghowrwal (57) ABSTRACT

Methods, media, and systems are provided for characterizing the synchronization behavior of a slave clock. A sequence of sync packets, usable to synchronize with a grandmaster clock, is transmitted from the grandmaster clock to a slave clock. The sequence of sync packets is modified by dropping one or more sync packets from the sequence, providing a pattern of dropped sync packets. A synchronization output of the slave clock is monitored and, based on the synchronization output, a determination is made as to whether the slave clock is synchronized while the sequence of sync packets is modified. A characterization of the synchronization behavior of the slave clock is stored with respect to the pattern of dropped sync packets. The process may be repeated for various patterns of dropped sync packets.

17 Claims, 4 Drawing Sheets

(56) References Cited

OTHER PUBLICATIONS

IPv6—RFC 6459, Korhonen, et al., IPv6 in 3rd Generation Partnership Project (3GPP) Evolved Packet System (EPS), Jan. 2012, 37 pages.
LTE—Evolved Universal Terrestrial Radio Access (E-UTRA); User Equipment (UE) radio transmission and reception (3GPP TS 36.101 version 11.5.0 Release 11), Jul. 2013, 431 pages. (Uploaded in five parts).
LTE-A—3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010, 34 pages.
UMTS—Universal Mobile Telecommunications System (UMTS); UTRAN overall description (3GPP TS 25.401 version 11.1.0 Release 11), Jan. 2013, 65 pages.
WiMAX—RFC 5563, Leung et al., WiMAX Forum / 3GPP2 Proxy Mobile IPv4, Feb. 2010, 39 pages.

\* cited by examiner

CHARACTERIZING SLAVE CLOCK SYNCHRONIZATION BEHAVIOR BY MEANS OF DROPPED SYNC PACKETS

CROSS-REFERENCE TO RELATED APPLICATIONS

This application is a continuation of U.S. application Ser. No. 14/043,643 (now U.S. Pat. No. 9,271,247), filed Oct. 1, 2013, entitled "Characterizing Slave Clock Synchronization Behavior by Means of Dropped Sync Packets," which is herein incorporated by reference in its entirety.

SUMMARY

A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to characterize the clock synchronization behavior of a slave clock in a network that utilizes Precision Timing Protocol.

Because the methods and algorithms used by the slave clocks are proprietary, the synchronization behavior of a given slave clock is unknown. An embodiment of the present invention provides means for characterizing the clock synchronization behavior of a slave clock. A sequence of sync packets, usable to synchronize with a grandmaster clock, is transmitted from the grandmaster clock to a slave clock. The sequence of sync packets is modified by dropping one or more sync packets from the sequence, providing a pattern of dropped sync packets. Based on a synchronization output provided by the slave clock, a determination is made as to whether the slave clock is synchronized while the sequence of sync packets is modified. A characterization of the synchronization behavior of the slave clock is stored with respect to the pattern of dropped sync packets. The process may be repeated for various patterns of dropped sync packets.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

GPS Global Positioning System
IP Internet Protocol
LCIB Low-Cost Internet Base Station
LTE Long Term Evolution
LTE-A Long Term Evolution Advanced
PDA Personal Data Assistant
PDV Packet Delay Variation
PTP Precision Time Protocol
SAR Site Aggregation Router
SLA Service Level Agreement
WDC Wireless Data Center Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM, flash memory, or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To address gaps in macro-network coverage (e.g., in buildings), to provide additional network capacity in congested areas, and for other reasons, macro-network service providers may install devices referred to herein as small cells, which may also be referred to as femtocells, picocells, microcells, low-cost internet base stations (LCIBs), and by other names.

A small cell must maintain strict packet timing, such as that required by 4G/LTE systems. When a plurality of small cells is deployed within a facility, the timing requirements become even tighter. In that case, clock synchronization between the small cells is essential to facilitate handoff from one small cell to the next as a user moves within the facility.

In typical macro network implementations, Global Positioning System (GPS) receivers are installed at every macro base station for clock frequency and phase synchronization. But in the case of small cell deployment, synchronization can be problematic. Locating small cells with GPS accessibility is not always possible. For example, in an installation where signals from the macro network cannot penetrate a building, it may be desirable to install small cells. These small cells would also require synchronization, and with GPS unable to penetrate the building, the use of Precision Time Protocol becomes a cost effective means of providing synchronization. Additionally, deploying each small cell with a GPS receiver may be cost prohibitive.

Precision Time Protocol (PTP) IEEE-1588v2 provides a means for frequency and phase synchronization of clocks throughout a network. In simplified terms, in a PTP system, a grandmaster clock sends PTP frames/packets to a slave clock (such as located at a small cell) which are time stamped. The term grandmaster clock as used herein refers to a device that performs the functions of a grandmaster clock, and may include devices that are dedicated to grandmaster clock functions, as well as devices that perform functions in addition to grandmaster clock functions. The grandmaster clock may be located at or within the facility that houses the small cells, or may be located elsewhere and communicate with the small cells through an intermediate network, such as the telecommunications network or other network. The slave clock uses the sync packets to accurately track the grandmaster clock and synchronize its internal clock with the grandmaster clock. The term slave clock, as used herein, refers to a device that performs the functions of a slave clock, and may include devices that are dedicated to slave clock functions, as well as devices that perform functions in addition to slave clock functions.

In packet-based networks, traffic may be asymmetric, with bursts of higher traffic, congestion, and so forth, which cause the sync packets to arrive at the slave clock with varying amounts of delay. This is referred to as Packet Delay Variation (PDV).

A sync packet having too much delay, or a higher degree of PDV, is useless to the slave clock for synchronizing with the grandmaster clock. Slave clock manufacturers use a variety of methods and algorithms, which are typically proprietary, for determining useful sync packets (i.e., packets that have reached their destination without undue delay). A sync packet deemed to be useful may be utilized by the slave clock to synchronize with the grandmaster clock, whereas the packets deemed to be useless are discarded. The algorithm used by a slave clock contributes to the slave clock's synchronization behavior, i.e., how well the slave clock synchronizes, or remains synchronized, given varying amounts of PDV, varying packet rates, and so forth.

It would be advantageous to rank, or classify, different makes and models of slave clocks based on their synchronization behaviors. Knowing the synchronization behaviors of various types of slave clocks may enable a communications provider to make an informed decision as to which type or types of slave clocks are preferred for deployment. Knowing the synchronization behaviors of the types of slave clocks that are already installed within a facility may enable the communications provider to make an informed decision as to what kind of service level agreement (SLA) to extend to the facility. Network behavior may also be characterized based on knowing the synchronization behaviors of slave clocks that are in the field. SLAs which bind access vendors to contractual agreements are written with certain requirements for frame loss, delay and PDV. Service providers want to know that these SLAs will be met or if they need to be adjusted or renegotiated. One embodiment may be used to provide accurate one-way delay measurement in a network with no congestion introduced. This would allow for a service provider to evaluate slave manufacturers as well as network SLAs based on this specific one-way delay.

However, the synchronization behavior of a third-party slave clock is likely to be unknown, because the internal synchronization algorithm is typically proprietary. An embodiment of the present invention provides means for characterizing the clock synchronization behavior of a slave clock.

In a first aspect, computer-readable media are provided for performing a method of characterizing a synchronization behavior of a slave clock. The method includes transmitting a sequence of sync packets from a grandmaster clock to a slave clock that includes a clock source. The sequence of sync packets is usable by the slave clock to synchronize with the grandmaster clock. The transmitted sequence of sync packets is modified such that one or more sync packets are removed from the sequence, providing a pattern of removed sync packets. While the transmitted sequence of sync packets is modified, a synchronization output of the slave clock is monitored and, based on the synchronization output of the slave clock, a determination is made as to whether or not the slave clock is synchronized with the grandmaster clock. A characterization of the synchronization behavior of the slave clock is stored, where the characterization includes an indication of whether or not the slave clock is synchronized with the grandmaster clock while the sequence of sync packets is modified.

In a second aspect, a method of characterizing a synchronization behavior of a slave clock is provided. The method includes transmitting a sequence of sync packets from a grandmaster clock to a slave clock, where the sync packets are received at an intermediate device and forwarded to the slave clock. A synchronization output of the slave clock is monitored, which indicates whether the slave clock is synchronized with the grandmaster clock. At the intermediate device, one or more of the sync packets are dropped. A determination is made as to whether the slave clock is synchronized with the grandmaster clock while the sync packets are dropped. An indication is stored that characterizes the synchronization behavior of the slave clock with respect to dropping the sync packets.

In a third aspect, a system is provided for characterizing a clock synchronization behavior of a slave clock. The system includes a grandmaster clock, a network impairment device, and a comparator device. The grandmaster clock is configured to transmit a sequence of sync packets to the slave clock through a network. The network impairment device is connected to the network and is configured to receive the sync packets via the network, forward the sync packets to the slave clock, and selectively drop one or more of the sync packets prior to forwarding the sync packets to the slave clock. The comparator device is configured to monitor a synchronization output of the slave clock and determine whether the slave clock is synchronized with the grandmaster clock while the one or more of the sync packets are dropped, based at least on the synchronization output. The comparator device is also configured to characterize the clock synchronization behavior of the slave clock with respect to variations in a pattern of dropped sync packets.

Figure 1:
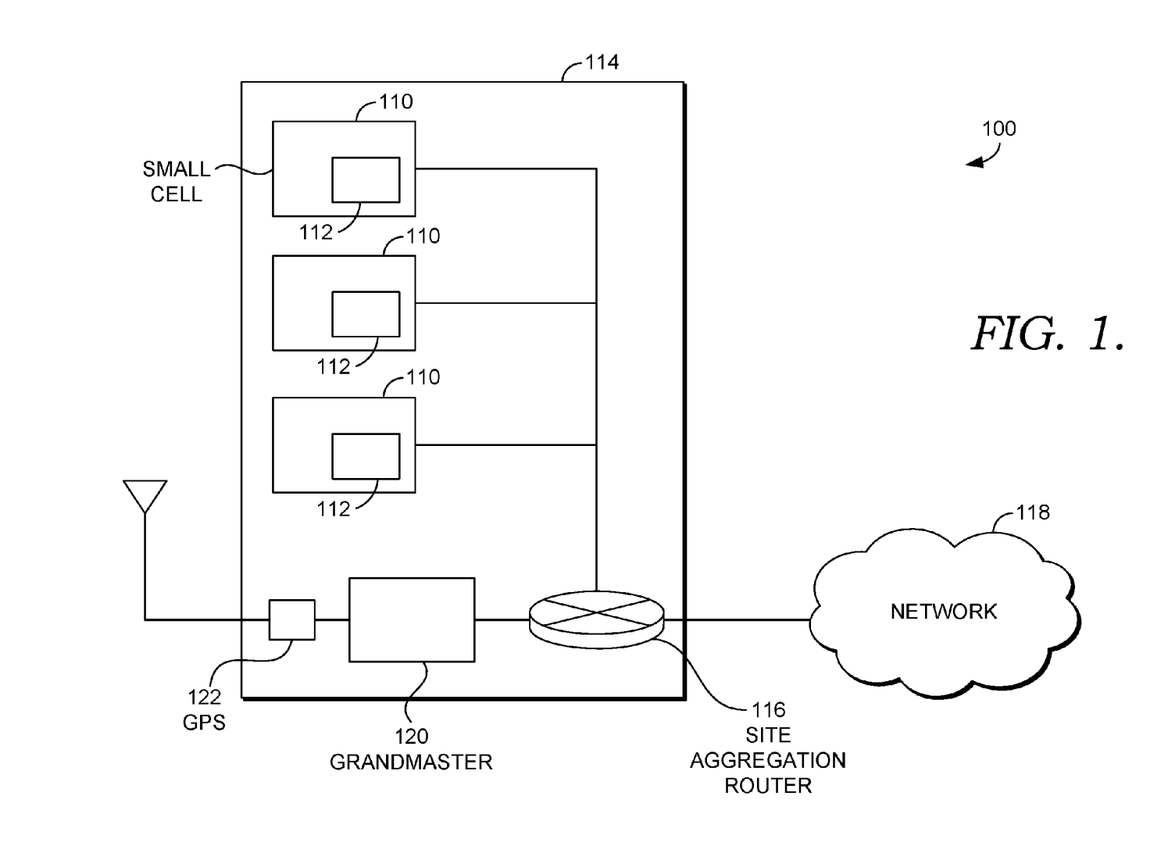
FIG. 1 depicts a network environment suitable for use in accordance with a small cell installation that utilizes Precision Time Protocol.

With reference to FIG. 1, a network environment is depicted that is suitable for use in accordance with a small cell installation that utilizes Precision Time Protocol, and is generally referred to as network environment 100. However, although system 100 is described in terms of the PTP protocol, some embodiments of the invention may utilize other types of clock synchronization protocols.

Network environment 100 includes small cells 110, which may reside within a building 114, such as a place of business, an apartment building, or other type of facility within which network connectivity is desired. Small cells 110 may also reside in an area of high network congestion, or in other areas where coverage by a single base station is impaired or small cell coverage is otherwise desirable. Types of small cells 110 may include the types described above, e.g., femtocells, picocells, and such, as well as other types of small cells that may perform similar functions. Additionally, the three small cells 110 depicted in FIG. 1 need not be of the same type of small cell. A combination of different types of small cells may exist within a facility, as well as a combination of different makes, models, versions of the same models, and so forth.

Each mall cell 110 includes a slave clock 112. The use of the term "includes" is not intended to imply that a small cell 110 and a slave clock 112 are, or are not, necessarily part of the same physical device. As used herein, the term "slave clock" refers to any device performing the functions of synchronizing a clock with a reference clock. A slave clock that utilizes the PTP protocol is sometimes referred to in the art as a "1588 slave" in reference to the IEEE-1588v2 specification. The term "slave clock" may also be used in the art to refer to a small cell.

Small cells 110 may communicate with a site aggregation router (SAR) 116, which may also be referred to as a service aggregation router, gateway, or other terms known in the art. The connections depicted between small cells 110 and SAR 116 are intended only to indicate communication between small cells 110 and SAR 116, and do not depict or imply any particular network configuration. SAR 116 provides network connectivity between the small cells and a network 118. Communication between SAR 116 and network 118 may also include other network devices that are not depicted, such as a satellite site, a wireless data center (WDC), or other devices that facilitate connection with network 118.

Network 118 may include types of networks such as LTE, LTE-A, as well as other types of networks and protocols that provide data or other services. Other types of networks and protocols may include, but are not limited to, IPv4, IPv6, GSM, GPRS, UMTS, and WIMAX. PTP may be used particularly with regard to providing LTE-A services to small cells; however, the discussion herein is not limited to a particular type of network or protocol.

A grandmaster clock 120 provides PTP sync packets to the small cells 110 via SAR 116. Grandmaster clock 120 is synchronized with a GPS 122 as a timing reference, and sends sync packets at a specified rate to small cells 110. PTP slave rates may include 1, 2, 4, 8, 16, 32, 64, and 128 packets per second. Slave clocks 112 use the sync packets to synchronize with GPS 122.

Aspects of synchronization with regard to PTP include frequency synchronization, phase synchronization, and time of day (TOD) synchronization. Characterization of slave clock synchronization behavior is described herein with regard to frequency synchronization; however, this description is not intended to limit embodiments of the invention to only frequency synchronization.

A sync packet has a time stamp associated with it, which indicates when the grandmaster clock sent the packet. In some embodiments, a sync packet contains the time stamp; in other embodiments, the time stamp is contained within a follow-up packet. There is inevitably some amount of delay between the time a sync packet is sent by the grandmaster clock and the time it is received by the slave clock, due to the path taken by the sync packet through the network. There is a minimum amount of delay associated with any network, referred to herein as packet floor delay. Each packet received by a slave clock is delayed by at least the amount of the packet floor delay, plus whatever additional delay may have been introduced during the travel of that particular packet. Due to fluctuating traffic conditions in a network, the PDV can vary widely.

A slave clock does not use every received sync packet for synchronization. Some packets are discarded as unusable, due at least in part to the amount of delay associated with the packet, e.g., if the delay is too great. A slave clock's internal algorithm or process for determining whether a packet is usable or unusable, and for maintaining synchronization, is typically proprietary to the slave clock's manufacturer. For illustrative purposes only, one manufacturer's slave clock may require only fifty percent of the sync packets to be usable in order to remain synchronized, whereas another manufacturer's slave clock may require ninety percent of the sync packets to be usable. One slave clock may be able to remain synchronized if no usable sync packets are received for ten seconds, while a different make of slave clock may lose synchronization after only two seconds without receiving usable synch packets. In addition to a slave clock's proprietary synchronization algorithm, another aspect of synchronization is the robustness of the slave clock's internal oscillator. The more robust the oscillator is, the more accurately it can maintain a given frequency during the time between usable packets.

Because a third-party slave clock's internal algorithm is proprietary, and thus unknown, the synchronization behavior of the slave clock cannot be directly determined or predicted based on its internal algorithm. An embodiment of the invention provides a method of characterizing a slave clock's synchronization behavior. This may include characterizing behavior related to either or both of the slave clock's synchronization algorithm and robustness of the oscillator.

Figure 2:
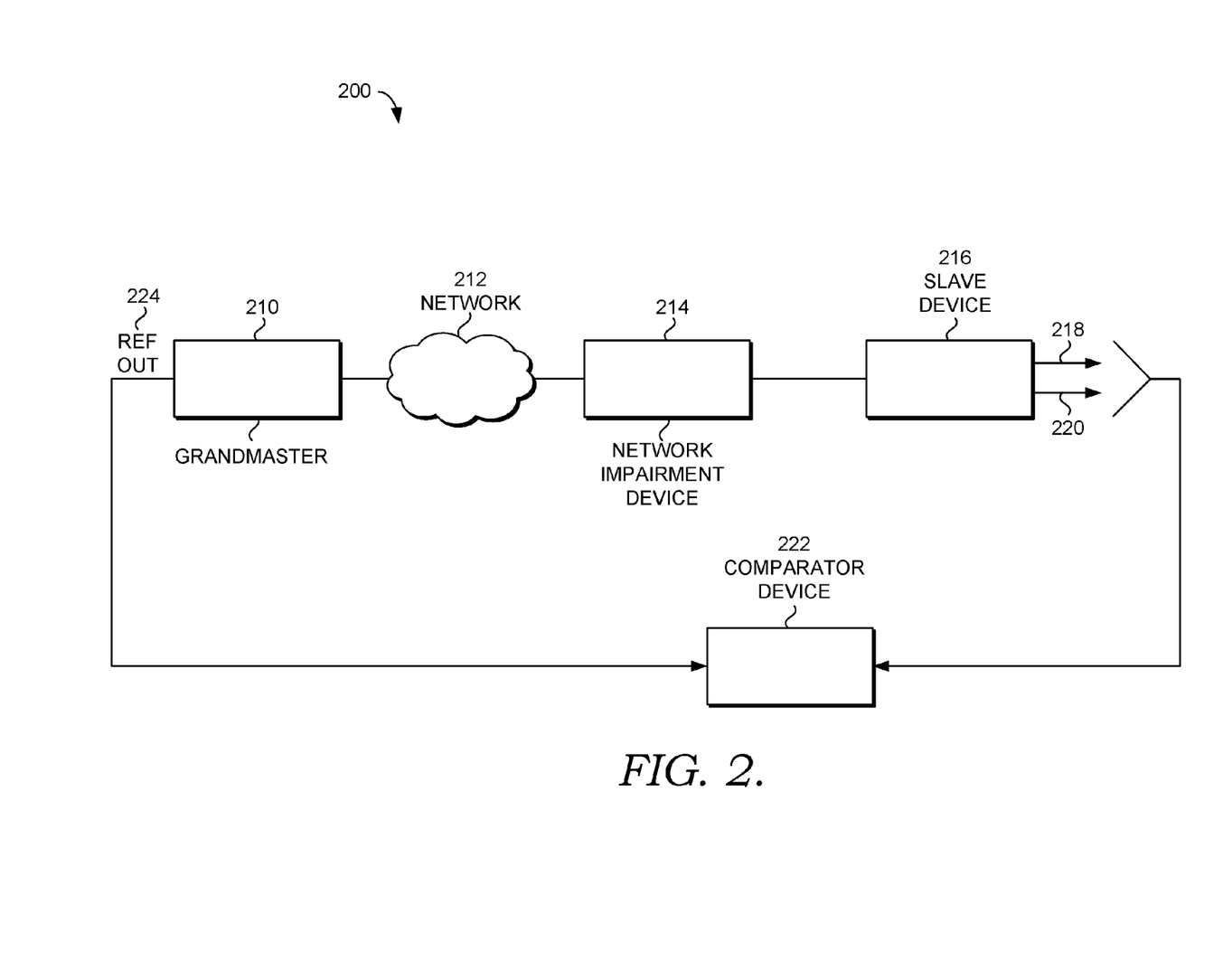
FIG. 2 depicts a block diagram of a system suitable for use in accordance with an embodiment of the present invention.

Referring now to FIG. 2, a block diagram of a system suitable for use in accordance with an embodiment of the present invention is depicted, and is generally referred to as system 200. System 200 depicts one possible system configuration, and is not intended to necessarily limit embodiments of the invention to a particular system configuration. In some embodiments, one or more functions of the elements depicted may be combined in a single device or split into multiple devices. In one embodiment, system 200 is used in a lab or as a test setup, not in a real-world network environment, although system 200 is not limited to use in a lab or as a test setup.

In one embodiment, system 200 includes a grandmaster clock 210 that is connected to a network 212, which is connected to a network impairment device 214, which is in turn connected to a slave clock 216. In an embodiment, grandmaster clock 210 is configured to transmit sync packets to slave clock 216 via network 212 and network impairment device 214. The sync packets may be transmitted by grandmaster clock 210 at a selected rate, such as 16, 32, 64, or 128 packets per second, and the timing of the sync packets may be based on a reference clock.

Network impairment device 214 receives the sync packets via network 212. Network impairment device 214 may forward, or transmit, all of the sync packets to slave clock 216, or may instead selectively drop, or discard, some of the sync packets. Accordingly, depending on the action taken by network impairment device 214, slave clock 216 receives either all of the packets transmitted by grandmaster clock 210, only a portion of the sync packets, or none of the sync packets.

In an embodiment, slave clock 216 provides one or more synchronization outputs that can be used to determine whether slave clock 216 is synchronized, or whether slave clock 216 considers itself to be synchronized. In one embodiment, the synchronization output is a frequency output 218 that tracks the grandmaster clock reference frequency when synchronized. Frequency output 218 may be 10 MHz in some embodiments. In another embodiment, the synchronization output is a pulse output 220, such as a one-pulse-per-second signal, when the slave clock is synchronized. In an embodiment, both frequency output 218 and pulse output 220 are provided.

In an embodiment, a comparator device 222 receives a reference frequency 224 that is provided by grandmaster clock 210 and monitors one or both of frequency output 218 and pulse output 220 from slave clock 216, and uses one or both to determine when slave clock 216 is synchronized or not synchronized (or whether slave clock 216 considers itself to be synchronized). Comparator device 222 may compare one or both of frequency output 218 and pulse output 220 with reference frequency 224 in determining whether, or how accurately, slave clock 216 is synchronized with grandmaster clock 210. Determining whether slave clock 216 is synchronized may include determining whether frequency output 218 is synchronized with the reference clock of grandmaster clock 210, and may also include determining whether pulse output 220, or another synchronization signal, is received from slave clock 216.

Network impairment device 214 and comparator device 222 are depicted as individual elements of system 200. However, the functions of network impairment device 214 and comparator device 222 may reside in separate devices, or in a single device. Comparator device may communicate with, or control, network impairment device 214. In an embodiment, another device (not shown) may control and coordinate both network impairment device 214 and comparator device 222.

In an embodiment, network impairment device 214 selectively drops sync packets in various patterns. For example, every other packet may be dropped, or every third packet may be dropped, or every other group of five packets may be dropped, for some period of time. As another example, all packets may be dropped for a given period of time, followed by not dropping any packets. Additionally, a given pattern of dropped packets may be repeated for some period of time.

For example, every other packet may be dropped for five seconds, then no packets dropped for two seconds, and that pattern may be repeated for ten minutes. Any of an essentially unlimited number of patterns and time periods may be selected. In one embodiment, the pattern of dropped sync packets includes dropping all of the sync packets for a period of time. The above examples of dropped packet patterns are provided for illustrative purposes only, and are not meant to limit the present invention in any way.

While packets are being dropped by network impairment device 214, comparator device 222 determines whether, or how accurately, slave clock 216 is synchronized with grandmaster clock 210, as described above. By selectively dropping packets in various patterns, the synchronization behavior of slave clock 216 can be determined with respect to each pattern of dropped packets. In an embodiment, a matrix can be generated for a plurality of different types of slave clocks, characterizing each device with respect to a given pattern of dropped packets. An exemplary matrix is depicted in Table 1, indicating whether or not particular slave clocks were synchronized with the grandmaster clock for each pattern of dropped packets. A matrix could be generated for any number of slave clocks, and any number of patterns of dropped packets. The simplified matrix depicted in Table 1 indicates "synched" or "not synched" for each slave clock and respective pattern, but in some embodiments, a matrix could contain other types of information. For example, a matrix may indicate any of whether a slave clock considers itself to be synchronized, whether the slave clock is actually synchronized, how accurately the slave clock is synchronized, and so forth. Specific measurements of the slave clock synchronization outputs may also be included in the matrix. Thus, the synchronization behavior of various types of slave clocks can be characterized, enabling one to rank, or classify, the various slave clocks based on synchronization behavior.

TABLE 1

Synchronization Behavior Matrix

| | Slave Clock 1 | Slave Clock 2 | Slave Clock 3 | Slave Clock 4 | Slave Clock 5 |
| --- | --- | --- | --- | --- | --- |
| Pattern 1 | Synched | Not synched | Not synched | Synched | Not synched |
| Pattern 2 | Not synched | Synched | Not synched | Synched | Not synched |
| Pattern 3 | Synched | Synched | Not synched | Synched | Synched |
| Pattern 4 | Synched | Not synched | Synched | Synched | Synched |

Different patterns of dropped sync packets may be used to characterize different aspects of a slave clock's synchronization behavior. For example, in an embodiment, all packets may be dropped for a given period of time for the purpose of monitoring how accurately frequency output 218 tracks reference frequency 224 when no sync packets are received. Dropping packets for an extended period of time may also enable one to determine how long it takes for a slave clock to lose synchronization when no packets are received. In another embodiment, sync packets may be dropped in a varied repetitive pattern to determine a minimum number of packets per time period to keep the slave clock from losing synchronization. One may utilize a number of different techniques for selectively dropping packets to characterize a slave clock's synchronization behavior. For example, one might choose to drop a specific number of packets within a given time period. In one embodiment, the sync packets may be transmitted at different selected rates, and the same specific number of packets may be dropped regardless of the selected sync packet rate. As another example, one may choose to drop a specific percentage of packets within a given time period. In an embodiment, the sync packets may be transmitted at different selected rates, and the same specific percentage of packets may be dropped regardless of the selected sync packet rate. Sync packets may also be dropped in a pattern, or manner, based on a characterization of a real-world network. For example, if a given real-world network typically has bursty traffic every ten seconds, one might determine that the bursty traffic introduces additional PDV in real-world sync packets. One could then utilize network impairment device 214 to drop packets in a pattern related to, or based on, the amount of PDV that would be experienced by real-world sync packets, to characterize how well a particular slave clock would remain synchronized in the given real-world network conditions.

FIG. 2 depicts slave clock 216 as part of system 200. However, in some embodiments, system 200 does not include slave clock 216. In one embodiment, system 200 is used to characterize a number of different slave clocks, and so may include the devices and/or functions of grandmaster clock 210, network 212, network impairment device 214, and comparator device 222, which together may be applied as a system to characterize a number of individual slave clocks.

Figure 3:
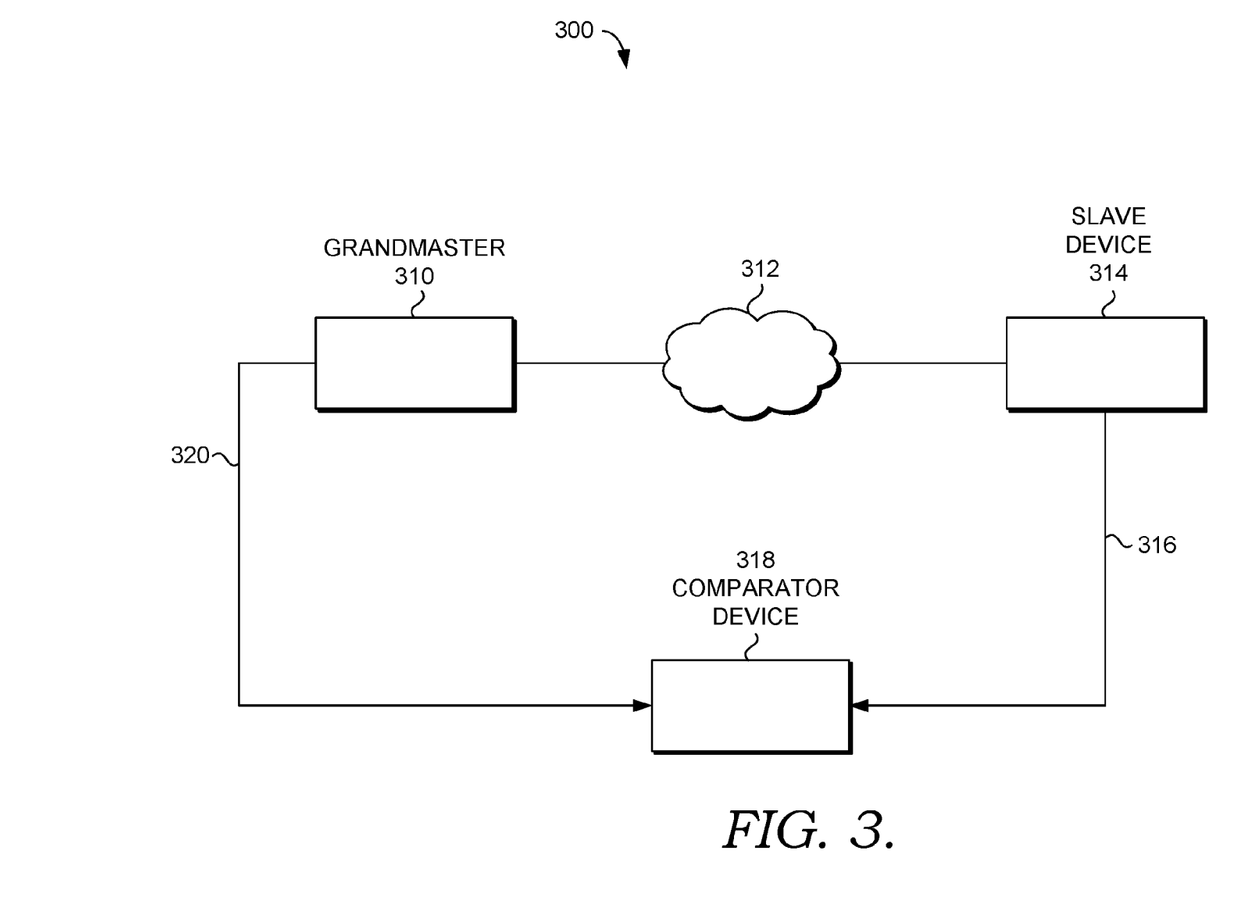
FIG. 3 depicts a block diagram of a system suitable for use in accordance with an embodiment of the present invention.

Referring now to FIG. 3, a block diagram of a system suitable for use in accordance with an embodiment of the present invention is depicted, and is generally referred to as system 300. System 300 depicts one possible system configuration, and is not necessarily intended to limit embodiments of the invention to a particular system configuration. In some embodiments, one or more functions of the elements depicted may be combined in a single device or split into multiple devices. In one embodiment, system 300 is used in a lab or as a test setup, not in a real-world network environment, although system 300 is not limited to use in a lab or as a test setup.

System 300 includes a grandmaster clock 310 that is connected to a network 312, which is connected to a slave clock 314. In an embodiment, grandmaster clock 310 is configured to transmit sync packets to slave clock 314 via network 312. The sync packets may be transmitted by grandmaster clock 310 at a selected rate, such as 16, 32, 64, or 128 packets per second, and the timing of the sync packets may be based on a reference clock. Slave clock 314 receives the sync packets via network 312. Unlike system 200 described above, in an embodiment of system 300, the functionality of discarding packets resides within slave clock 314 rather than in an intermediate network impairment device. Slave clock 314 may selectively discard, or ignore, a portion of the sync packets prior to utilizing the sync packets to synchronize with grandmaster clock 310. This function of selectively dropping packets may be enabled as a test function or particular operating mode of slave clock 314. The function of selectively dropping packets may, in this case, be included in slave clock 314 by the manufacturer.

In an embodiment, slave clock 314 provides one or more synchronization outputs 316 that can be used to determine whether slave clock 314 is synchronized, or at least whether slave clock 314 considers itself to be synchronized. Synchronization output 316 may include one or both of a frequency output and a pulse output as described above with regard to FIG. 2. In another embodiment, a comparator device 318 receives a reference frequency 320 that is provided by grandmaster clock 310, and monitors synchronization output 316 to determine when slave clock 314 is synchronized or not synchronized (or whether slave clock 314 considers itself to be synchronized).

Comparator device 318 is depicted as an individual element of system 300. However, in some embodiments, the functionality of comparator device 318 resides in a separate device, as depicted; while in other embodiments, the functionality of comparator device 318 may reside in either of the grandmaster or slave clocks. For example, slave clock 314 may include the functions of comparator device 318, such that slave clock 314 both selectively discards sync packets and characterizes its own behavior with respect to various patterns of discarded packets. In one embodiment, slave clock 314 can be accessed via another device, such as a computer or network device, to obtain the characterization of the synchronization behavior of slave clock 314. In another embodiment, grandmaster clock 310 transmits sync packets to slave clock 314 and also monitors and characterizes the synchronization behavior of slave clock 314.

Figure 4:
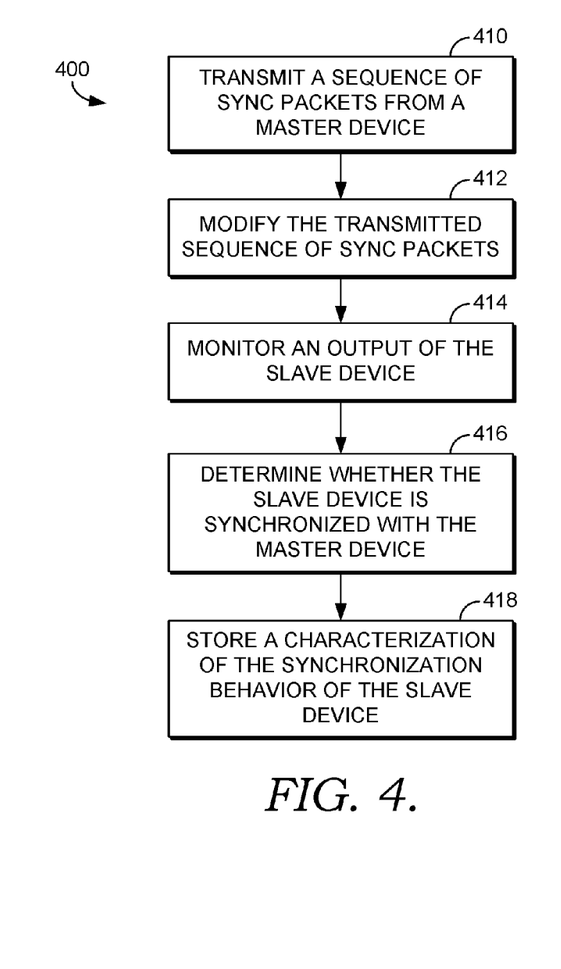
FIG. 4 depicts a flowchart of a method suitable for use in accordance with an embodiment of the present invention.

Referring now to FIG. 4, a flowchart is depicted for a method suitable for use in accordance with an embodiment of the present invention, and is generally referred to as method 400. One or more of the steps and tasks represented in FIG. 4 may be embodied on computer-readable media, which is readable by a computing device to carry out the step or task. Although the steps and tasks depicted in FIG. 4 are described in an order, the steps may not necessarily be carried out in the same order in which they are described.

At a step 410, a sequence of sync packets is transmitted from a grandmaster clock to a slave clock. In an embodiment, the slave clock includes, or is associated with, a clock source. The sync packets are usable by the slave clock to synchronize the clock source with the grandmaster clock. At a step 412, the sequence of sync packets is modified. In one embodiment, the modification is performed at an intermediate device that receives the sync packets and forwards them to the slave clock. The intermediate device may modify the sequence of packets by dropping some or all of the sync packets prior to forwarding the sync packets to the slave clock, thus providing a pattern of removed sync packets. In an embodiment, prior to modifying the transmitted sequence of sync packets, a determination is made that the clock source of the slave clock is synchronized with the grandmaster clock.

At a step 414, a synchronization output of the slave clock is monitored. In an embodiment, the synchronization output provides a signal or indication that is usable to determine whether the slave clock is synchronized, or considers itself to be synchronized, with the grandmaster clock. The synchronization output may include one or more synchronization outputs, such as described above with regard to outputs 218 and 220 in FIG. 2. At a step 416, a determination is made as to whether the slave clock is synchronized with the grandmaster clock while the sequence of sync packets is modified. In an embodiment, the determination is based on one or more of the synchronization outputs from the slave clock. The determination may be made by a device that monitors the slave clock, and that may also monitor a reference frequency provided by the grandmaster clock, as described above with regard to FIG. 2. At a step 418, a characterization of the synchronization behavior of the slave clock is stored. The characterization includes an indication of whether the slave clock is synchronized or not synchronized with the grandmaster clock while the sequence of sync packets is modified.

In one embodiment, the pattern of removed sync packets is varied to provide a plurality of patterns of removed packets, and for each pattern of removed packets, the synchronization output of the slave clock is monitored and a determination is made as to whether the clock source of the slave clock is synchronized with the grandmaster clock while the sequence of sync packets is modified. In an embodiment, the synchronization behavior includes whether the clock source of the slave clock is synchronized with the grandmaster clock with respect to frequency. An indication may be stored that characterizes the clock synchronization behavior of the slave clock with respect to each pattern of removed packets. The clock synchronization behavior may include whether the clock source of the slave clock is synchronized or not synchronized with the grandmaster clock, and may also include a measure of how accurately the clock source of the slave clock is synchronized with the grandmaster clock.

Figure 5:
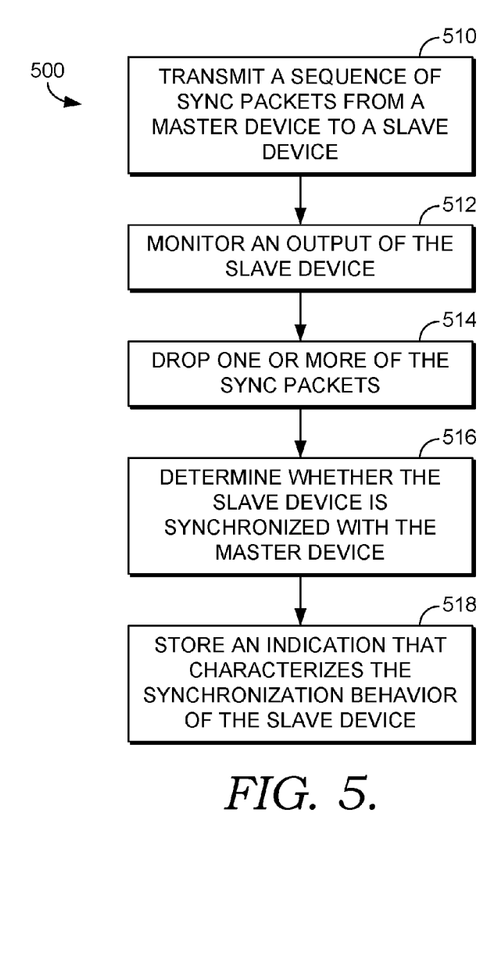
FIG. 5 depicts a flowchart of a method suitable for use in accordance with an embodiment of the present invention.

Referring now to FIG. 5, a flowchart is depicted for a method suitable for use in accordance with an embodiment of the present invention, and is generally referred to as method 500. One or more of the steps and tasks represented in FIG. 5 may be embodied on computer-readable media, which is readable by a computing device to carry out the step or task. Although the steps and tasks depicted in FIG. 5 are described in an order, the steps may not necessarily be carried out in the same order in which they are described.

At a step 510, a sequence of sync packets is transmitted from a grandmaster clock to a slave clock by way of an intermediate device. The intermediate device receives the sync packets and forwards or transmits them to the slave clock. In an embodiment, the sync packets are usable by the slave clock to synchronize its clock frequency with the grandmaster clock. At a step 512, a synchronization output of the slave clock is monitored which indicates, or is usable to determine, whether the slave clock is synchronized with the grandmaster clock. The synchronization output may include one or more synchronization outputs, such as described above with regard to outputs 218 and 220 in FIG. 2.

At a step 514, one or more of the sync packets are selectively dropped such that the slave clock may receive all, some, or none, of the sync packets. In an embodiment, the one or more sync packets are dropped by the intermediate device. At a step 516, a determination is made as to whether the slave clock is synchronized, or considers itself to be synchronized, with the grandmaster clock while the one or more sync packets are dropped. At a step 518, an indication is stored which characterizes the synchronization behavior of the slave clock with respect to dropping the one or more of the sync packets. The synchronization behavior of the slave clock may include whether a frequency of a clock source in the slave clock is synchronized with a frequency of a reference clock associated with the grandmaster clock, and may also include how long the slave clock remains synchronized in response to dropping one or more of the sync packets. In one embodiment, the sync packets are dropped in a repetitive pattern, and may be dropped in a variety of repetitive patterns such that each of the repetitive patterns is transmitted for some period of time; such that, an indication may be stored that characterizes the synchronization behavior of the slave clock with respect to each variety of pattern.

In one embodiment, the sequence of sync packets may be transmitted from the grandmaster clock at a selected rate, or at one or more of a plurality of rates, such that the sync packets may be transmitted at different rates during different periods of time. The monitoring of the slave clock, dropping of packets, determining whether the slave clock is synchronized, and storing the indication may be repeated for one or more of the selected rates.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having embodied thereon computer-usable instructions that, when executed by a processing device, perform a method of characterizing a synchronization behavior of a slave device by dropping sync packets, the method comprising:
   transmitting a sequence of sync packets from a grandmaster device to the slave device, wherein the slave device includes a clock source, and wherein the sequence of sync packets is usable by the slave device to synchronize the slave device with the grandmaster device;
   modifying the transmitted sequence of sync packets such that one or more sync packets are removed from the sequence, providing a pattern of removed sync packets;
   while modifying the transmitted sequence of sync packets,
   A) monitoring a synchronization output of the slave device, and
   B) based on the synchronization output of the slave device, determining whether the slave device is synchronized or not synchronized with the grandmaster device; and
   storing a characterization of the synchronization behavior of the slave device, wherein the characterization includes an indication of whether the slave device is synchronized or not synchronized with the grandmaster device while the sequence of sync packets is modified;
   wherein prior to said modifying the transmitted sequence of sync packets, determining that the slave device is synchronized with the grandmaster device.

2. The media of claim 1, the method further comprising:
   varying the pattern of removed sync packets to provide a plurality of patterns of removed sync packets;
   repeating said monitoring, and said determining whether the slave device is synchronized or not synchronized with the grandmaster device, for each pattern of removed sync packets;
   wherein for each pattern of removed sync packets, a determination is made as to whether the slave device is synchronized with the grandmaster device while the sequence of sync packets is modified.

3. The media of claim 2, the method further comprising for each pattern of removed sync packets, storing an indication that characterizes the synchronization behavior of the slave device with respect to the pattern of removed sync packets.

4. The media of claim 3, wherein the synchronization behavior includes whether the clock source of the slave device is synchronized with the grandmaster device with respect to frequency.

5. A method of characterizing a synchronization behavior of a slave device by dropping sync packets, comprising:
    transmitting a sequence of sync packets from a grandmaster device to the slave device, wherein the slave device includes a clock source, and wherein the sequence of sync packets is usable by the slave device to synchronize the slave device with the grandmaster device;
    modifying the transmitted sequence of sync packets such that one or more sync packets are removed from the sequence, providing a pattern of removed sync packets;
    while modifying the transmitted sequence of sync packets,
        A) monitoring a synchronization output of the slave device, and
        B) based on the synchronization output of the slave device, determining whether the slave device is synchronized or not synchronized with the grandmaster device; and
    storing a characterization of the synchronization behavior of the slave device, wherein the characterization includes an indication of whether the slave device is synchronized or not synchronized with the grandmaster device while the sequence of sync packets is modified;
    wherein prior to said modifying the transmitted sequence of sync packets, determining that the slave device is synchronized with the grandmaster device.

6. The method of claim 5, comprising:
    varying the pattern of removed sync packets to provide a plurality of patterns of removed sync packets;
    repeating said monitoring, and said determining whether the slave device is synchronized or not synchronized with the grandmaster device, for each pattern of removed sync packets;
    wherein for each pattern of removed sync packets, a determination is made as to whether the slave device is synchronized with the grandmaster device while the sequence of sync packets is modified.

7. The method of claim 6, comprising for each pattern of removed sync packets, storing an indication that characterizes the synchronization behavior of the slave device with respect to the pattern of removed sync packets.

8. The method of claim 7, wherein the synchronization behavior includes whether the clock source of the slave device is synchronized with the grandmaster device with respect to frequency.

9. The method of claim 5, wherein the pattern of removed sync packets is a repetitive pattern.

10. The method of claim 5, wherein the pattern of removed sync packets includes cessation of all of the sync packets for a period of time.

11. A system for characterizing a clock synchronization behavior of a slave device by dropping sync packets, comprising:
    a grandmaster device that transmits a sequence of sync packets to the slave device through a network, wherein the sync packets are usable by the slave device to synchronize the slave device with the grandmaster device;
    a network impairment device, connected to the network, that
        A) receives the sync packets via the network,
        B) forwards the sync packets to the slave device, and
        C) selectively drops one or more of the sync packets prior to forwarding the sync packets to the slave device; and
    a comparator device that
        A) monitors a synchronization output of the slave device,
        B) determines whether the slave device is synchronized with the grandmaster device while the one or more of the sync packets are dropped, based at least on the synchronization output, and
        C) stores a characterization of the clock synchronization behavior of the slave device with respect to variations in a pattern of dropped sync packets, wherein the pattern of dropped sync packets includes cessation of all of the sync packets for a period of time.

12. The system of claim 11, wherein the network impairment device and the comparator device may be the same device, or separate devices in communication with each other.

13. The system of claim 11, wherein a timing of the sync packets transmitted by the grandmaster device is based on a reference clock, and wherein determines whether the slave device is synchronized with the grandmaster device includes determines whether the synchronization output of the slave device is synchronized with the reference clock.

14. The system of claim 11, wherein a timing of the sync packets transmitted by the grandmaster device is based on a reference clock, and wherein determines whether the slave device is synchronized with the grandmaster device includes determines whether the synchronization output is received from the slave device.

15. The system of claim 11, wherein the pattern of dropped sync packets is a repetitive pattern.

16. The system of claim 11, wherein the pattern of dropped sync packets includes a pattern that is based on a characterization of a real-world network behavior.

17. The system of claim 11, wherein the clock synchronization behavior of the slave device includes whether a frequency of the slave device is synchronized with a frequency of a reference clock associated with the grandmaster device, and wherein the sync packets include Precision Timing Protocol (PTP) frequency sync packets.

* * * * *